United States Patent [19]

Tan et al.

[11] Patent Number: 4,636,835
[45] Date of Patent: Jan. 13, 1987

[54] COLOR TELEVISION TRANSMISSION OR DATA STORAGE SYSTEM HAVING TIME-DIVISION MULTIPLEX ENCODING AND DATA GENERATOR AND RECEIVER SUITABLE THEREFOR

[75] Inventors: Sing L. Tan; Louis P. M. Schreurs, both of Eindhoven, Netherlands

[73] Assignee: U.S. Philips Corporation, New York, N.Y.

[21] Appl. No.: 669,280

[22] Filed: Nov. 7, 1984

[30] Foreign Application Priority Data

Nov. 22, 1983 [NL] Netherlands .......................... 8304007

[51] Int. Cl.$^4$ ............................................ H04N 11/08
[52] U.S. Cl. ......................................... 358/12; 358/31
[58] Field of Search .................................... 358/12–16, 358/31

[56] References Cited

U.S. PATENT DOCUMENTS 4,530,004  7/1985  Achiha ................................... 358/13

FOREIGN PATENT DOCUMENTS

WO85/00492  1/1985  PCT Int'l Appl. .................... 358/12

OTHER PUBLICATIONS

Draft New Report—Satellite Transmission of Multiplexed Analogue Component (MAC) Television Signals, 23 Sep. 1983, Document 10-11S/106-E, published by Comité Consultatif International des Radiocommunications.

Primary Examiner—Michael A. Masinick
Attorney, Agent, or Firm—Thomas A. Briody; Jack Oisher; William J. Streeter

[57] ABSTRACT

Color-television transmission (or data storage) system having time-division multiplex encoding. A data source is coupled, via an encoding circuit for time-division multiplex coding and signal compression, to a transmission (or storage) channel to which a data receiver comprising a decoding circuit is connectable. Luminance information associated therewith is transmitted noncompressed in a number of p different line periods. The system is compatible with an existing color television standard because the chrominance information, supplied during the q line periods, is also added to the luminance information during the p line periods in accordance with the standard.

9 Claims, 5 Drawing Figures

COLOR TELEVISION TRANSMISSION OR DATA STORAGE SYSTEM HAVING TIME-DIVISION MULTIPLEX ENCODING AND DATA GENERATOR AND RECEIVER SUITABLE THEREFOR

BACKGROUND OF THE INVENTION

The invention relates to a color television transmission (or data storage) system having time-division multiplex encoding, the system comprising a data generator, at least one data receiver and a transmission (or data storage) channel arranged between the generator and the receiver, the data generator comprising a signal source for producing signals containing luminance, chrominance, synchronizing and identification information and an encoding circuit for supplying at an output, a time-division multiplex encoded signal for transmission via the transmission channel or storage in the data storage channel, this time-division multiplex encoded signal, containing, during a number of p line periods of a field period, the non-compressed luminance information, and, during a number of q other line periods, the time-compressed chrominance information associated with this luminance information, the number p+q being less than the number of m line periods forming a field period, the data receiver comprising a decoding circuit coupled to said channel and suitable for supplying signals containing at least luminance and chrominance information which largely corresponds to the data produced by the signal source in the data generator. The invention also relates to a data generator and receiver suitable therefor.

Such a system for, more specifically, transmission is described in a published report "Document 10-11S/106-E, Sept. 23, 1983" published by the Comité Consultatif International des Radiocommunications, entitled "Draft new report: Satellite transmission of Multiplexed Analogue Component (MAC) television signals" and presented during a meeting of the C.C.I.R. in Geneva, September 1983. The report describes several variants of so-called MAC-picture coding. For some variants, it holds that in the data generator, which is in the form of a transmitter the luminance and the chrominance information, which each comprise two components per line period, are each subjected to time compression. In the time-division multiplex encoded signal, the luminance information associated with each line period is present in the time-compressed form. The picture information per line period in the time-division multiplex encoded signal is sequentially composed from the time-compressed chrominance information components associated therewith.

The above-mentioned report also describes variants having time-division multiplex encoding at the field frequency. In one variant, only the luminance information is transmitted during a plurality of line periods in the field period, while during other line periods only the associated time-compressed chrominance information components are transmitted. The other line periods can be divided into two groups, one of the two chrominance information components being supplied during the first group, while the other chominance information component is supplied during the second group of line periods. The first group may occur at the beginning of the field period, whereafter the line periods having the luminance information and thereafter the second group of line periods having the chrominance information occur.

In still further variants, one of the two chrominance information components is supplied during a number of line periods. During the subsequent line periods the picture information is sequentially composed for each line period from the other chrominance information component and the luminance information. The three information components are time-compressed. The transitions between the different information components can, moreover, be variable.

In the receiver, the time-division multiplex encoded signal is derived from the signal received via, for example, the satellite connection and applied to a complementary decoding circuit which, with the aid of the synchronizing and identification information, produces a time-decompression for the information transmitted in time-compressed form.

In the foregoing, a transmission channel in the form of a satellite connection is mentioned as an example. It will be obvious that the transmission of information can also be effected with the aid of a data storage channel. Such a storage channel comprises data storage and data reproducing equipment, such as, for example, tape and record recording and reproducing devices.

SUMMARY OF THE INVENTION

The invention has for its object to provide a color television transmission (or data storage) system having time-division multiplex encoding, in which a signal produced by a data generator can not only be received and processed for display by a data receiver suitable therefor but also by a prior art receiver which is suitable for receiving and processing signals in accordance with an existing color television standard, of course, with the picture quality inherent to such a receiver. To that end a color television system according to the invention is characterized in that the encoding circuit is such that it supplies, at the output, a signal in which the chrominance information supplied during said q line periods is also added to the luminance information during said p line periods in accordance with the PAL, NTSC or SECAM-color television standards.

Because of the measure in accordance with the invention, the chrominance information is actually supplied twice, namely, in both the time-compressed signal and in the signal in accordance with the color television standard. In this way, the transmission (or data storage) system according to the invention is compatible, as the signals transmitted thereby can be displayed by both future data receivers and the numerous receivers already in existence.

A data generator suitable for use in a color television system according to the invention, in which the encoding circuit comprises a time division multiplex circuit, for receiving the luminance and chrominance information components and for generating the time-division multiplex encoded signal therefrom, the time-division multiplex circuit comprising a memory which, during the number of p consecutive line periods, is operative with the same write and read rates for the luminance information, and a memory which, during a number of q consecutive line periods, is operative with different write and read rates for processing the chrominance information, is characterized in that the encoding circuit also comprises a sub-carrier generator for generating a sub-carrier in accordance with said standard, a modulator for modulating the chrominance information produced by the signal source on the sub-carrier signal in the manner prescribed by the standard, a delay device for delaying the modulated chrominance signal obtained for the duration of one field period and an adder stage for adding the delayed signal to the time-division multiplex encoded signal.

Preferably, the data generator according to the invention is characterized in that the modulator is inoperative during said q line periods. Owing to this measure, no cross-talk occurs between the modulator signal and the signal from the time-division multiplex circuit.

The data generator may advantageously be further characterized in that it comprises means for suppressing the time-compressed chrominance information on display by a data receiver suitable for receiving and displaying a color television signal in accordance with the standard.

A data receiver suitable for use in a color television system according to the invention, in association with such a data generator, has the decoding circuit for the time-decompression of the chrominance information which comprises memories having different write and read rates, these memories for time-division multiplex decoding being writable in different time periods, is characterized in that the decoding circuit also comprises an adder stage for adding a reference information to the received chrominance information outside said p lines periods, this reference information being fundamentally complementary to the reference information added in the data generator.

A still better picture quality is obtained for the data receiver if it is characterized in that the decoding circuit also comprises a sub-carrier generator for generation a sub-carrier signal in accordance with said standard which is substantially in synchronism with the sub-carrier signal in the data generator, a modulator for modulating the chrominance information supplied by the decoding circuit onto the subcarrier signal in the way prescribed by the standard and a subtracting stage for subtracting during said p line periods the modulated chrominance signal obtained from the signal received.

DESCRIPTION OF THE DRAWINGS

The invention will now be further described, by way of example, with reference to the accompanying Figures, in which.

DESCRIPTION OF THE PREFERRED EMBODIMENT

Figure 1:
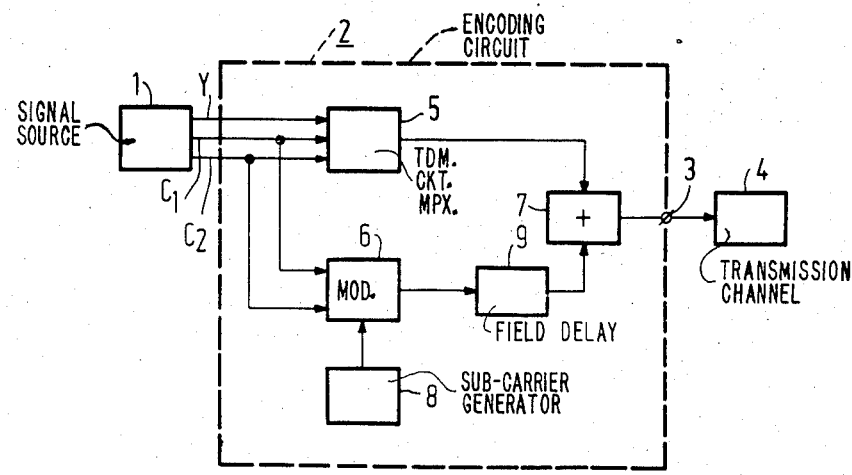
FIG. 1 shows a block diagram of an embodiment of a data generator suitable for use in a color television system according to the invention.

In FIG. 1, reference numeral 1 denotes a signal source in a block diagram of a color television data generator in accordance with the invention. Signal source 1 is connected to an encoding circuit 2, an output 3 of which is connected as an output of the data generator to a transmission (or data storage) channel 4. Channel 4, when used as a transmission channel, may be in the form of a satellite connection, terrestrial transmission channel, a cable link or the like. When used as a data storage channel, channel 4 comprise data storage and reproducing equipment such as, for example, tape and/or record recording and reproducing devices. The specific construction of channel 4 is not relevant to the invention.

At the signal source 1 of FIG. 1, it is indicated that it produces information components Y, $C_1$ and $C_2$. When source 1 is a color television camera, Y represents a luminance information component and $C_1$ and $C_2$ represent chrominance information components. In the NTSC television standard, $C_1$ and $C_2$ are the standardized chrominance information components I and Q. In the PAL standard, $C_1$ and $C_2$ are the components U and V.

Encoding circuit 2 comprises a time-division multiplex circuit 5, to which information components Y, $C_1$ and $C_2$ are applied, and a modulator 6 to which information components $C_1$ and $C_2$ are applied. Circuit 5 generates a time-division multiplex encoded signal which, during a number of p line periods of a field period, contains the luminance information Y in the non-compressed form and during a number of q different line periods contains the chrominance information components $C_1$ and $C_2$, associated with this luminance information Y, in the time-compressed form. In this situation, the number p+q is smaller than the number of m line periods which together constitute a field period. In the event of a standardized television system wherein m=321.5, a number q=62 can be chosen, while p is four times greater, that is to say p=248. During the field blanking period, the signal of circuit 5 contains synchronizing and identification information components. The signal generated by circuit 5 is applied to a first input of an adder stage 7.

A sub-carrier signal produced by a sub-carrier generator 8 is applied to modulator 6. The frequency of this signal is the frequency prescribed by a color television standard, i.e., for example, 4. 43361875 MHz for the PAL-standard. By means of modulator 6, the chrominance signals $C_1$ and $C_2$ are modulated in known manner on the sub-carrier to obtaining a modulated chrominance signal in accordance with the standard, which is applied to a delay device 9. In known manner, the modulator 6 is made inoperative during the field blanking period, except at the beginning of the line periods which, in the standard, are designated when the color burst signal is to be transmitted. In addition, modulator 6 is also made inoperative during the above-mentioned q line periods, but not during the occurrence of the color burst signal. Device 9 produces a delay which is equal to the duration of one field period. This delay is necessary as the signal from multiplexer 5 is also delayed relative to the incoming signals Y, $C_1$ and $C_2$. The signal delayed by device 9 is applied to a second input of stage 7. Stage 7 adds its two inputs signals together and the output signal of the encoding circuit 2 is available at the output of stage 7, which constitutes the output 3 of encoding circuit 2. During a field period, this signal contains, during the above-mentioned p line periods, both the time-division multiplex encoded signal and the modulated chrominance signal. As the first-mentioned signal contains the non-compressed luminance information, the output signal is a color television signal in accordance with the PAL standard during the p line periods. During the above-mentioned q line periods, modulator 6 does not supply a picture signal, so that the output signal of encoding circuit 2 only contains the time-compressed chrominance information. So no cross-talk occurs.

Figure 2:
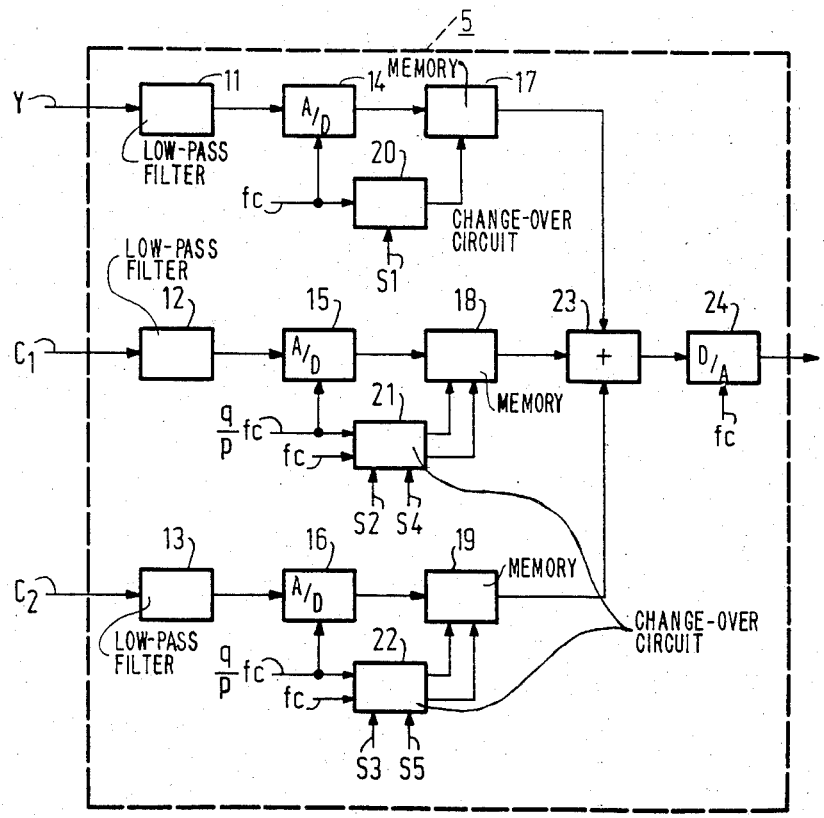
FIG. 2 shows an embodiment of the time-division multiplex circuit present therein.

Time-division multiplex circuit 5 may have a construction as shown in FIG. 2. Circuit 5 comprises three low-pass filters 11, 12 and 13 to which the respective information components Y, $C_1$ and $C_2$ are applied. These filters are followed by respective analog-to-digital converters 14, 15 and 16, to which clock pulses are applied, these clock pulses being applied at a clock pulse frequency fc of, for example, approximately 20 MHz., to converter 14, and at a clock pulse frequency q/p fc, to converters 15 and 16. These converters 14, 15 and 16 are followed by memories 17, 18 and 19, respectively, which are in the form of digital memories. It holds, more specifically, that memories 18 and 19 must be of a type having different write and read rates, which is not a requirement for memory 17.

For simultaneously writing and reading information at memory 17, a clock pulse signal is applied thereto at the clock pulse frequency fc, via a change-over circuit 20. For switching the change-over circuit 20, a switching signal S1 is applied thereto. During the occurrence of signal S1, the clock pulse signal (fc) is applied to memory 17, and memory 17 is disabled outside the occurrence of the switching signal. At memories 18 and 19, respectively, it is indicated that clock pulse signals are applied via a respective change-over circuits 21 and 22. A clock pulse signal having the clock pulse frequency q/p fc can be applied, under the control of a switching signal S2 and S3, respectively, via the respective change-over circuits 21 and 22 and a clock pulse signal having the clock pulse frequency fc can be applied under the control of switching signals S4 and S5, respectively. Outputs of memories 17, 18 and 19 are connected to inputs of an adder stage 23. An output of adder stage 23 is connected to the output of multiplex circuit 5 via a digital-to-analog converter 24 to which a clock pulse signal is applied at the clock pulse frequency fc. If channel 4 is suitable for the transmission (or storage) of digital information, converter 24 may be omitted, in which case also the chrominance signal coming from modulator 6 and delay device 9 is a digital signal. Let it be assumed that channel 4 is suitable for processing analog signals.

Signal S1 occurs during p line periods, in which period of time memory 17 is simultaneously written and read, the luminance information, which is read, having been written-in one field period earlier. Signals S2 and S3 also occur during the same p line periods. These signals have half the line frequency and the inverse polarity, causing the chrominance information component $C_1$ of one line to be written into memory 18 and the component $C_2$ of the subsequent line into memory 19. The circuit shown in FIG. 2 can be simplified by substituting one converter and one memory subsequent thereto for elements 15, 16, 18 and 19, the converter sequentially receiving the component $C_1$ from one line and the component $C_2$ of the subsequent line. Instead of this alternation, switching signals S2 and S3 may be identical, so that the components $C_1$ and $C_2$ of one line are written and those of the subsequent line are skipped.

Writing into memory 17 is effected at the clock pulse frequency fc, and into memories 18 and 19 at the lower clock pulse frequency q/p fc. This causes the luminance information associated with the number of line periods p to be conveyed to a corresponding number of line memory locations p in memory 17, while the chrominance information component associated with the number of line periods $\frac{1}{2}$p, in which actual writing is effected, is conveyed to a number of line memory locations q/p times $\frac{1}{2}$p, which is equal to $\frac{1}{2}$q. If, after having been written-in, the information components are read at the same rate, namely, with the aid of the clock pulse frequency fc from memories 17, 18 and 19, the result is that memories 18 and 19 effect time compression. A time compression factor equal to q/p follows from the given values ($\frac{1}{2}$p to $\frac{1}{2}$q). The switching signal for reading memory 18 occurs during a number of line periods $\frac{1}{2}$q after said p line periods. Thereafter, the switching signal S5 is produced for reading from memory 19, more specifically, during a number of line periods $\frac{1}{2}$q. Thereafter, the luminance information Y associated with the processed chrominance information components, is read. In intermediate periods, synchronizing and identification information components are present in the time-division multiplex encoded signal. For example, field synchronizing information is present in said signal in field blanking periods between the information components $C_1$ and $C_2$, which are associated with each other.

If no further measures were taken, the time-division multiplex encoded signal supplied by circuit 5 would, on display on a display screen, show a picture having different information components in predominantly three horizontal strips located in the direction of line scan. In a central intermediate strip comprising, for example, p line periods, the luminance information of a given field period would be present. Immediately above it, in a strip containing $\frac{1}{2}$p line periods, the associated chrominance information component $C_2$ would occur. In the bottom strip, containing the number of line periods $\frac{1}{2}$q, the chrominance information component $C_1$ associated with the subsequent field period would occur. Thus, the chrominance information component $C_1$ associated with the intermediate strip containing the luminance information Y occurs at the end of the preceding field period. The horizontal strips may alternatively be positioned differently. Thus, the strips containing information components $C_1$ and $C_2$ might, for example, be positioned directly below each other and above the strip containing luminance information, for which signals S4 and S5 must be changed in a corresponding way with respect to what has been described in the foregoing. The borders between the different portions of the picture may optionally be movable. Such a move may be desired in order to obtain a changed aspect ratio of the display picture on display by means of a suitable data receiver. To that end, suitable identification information must be contained in the time-division multiplex encoded signal.

Figure 3:
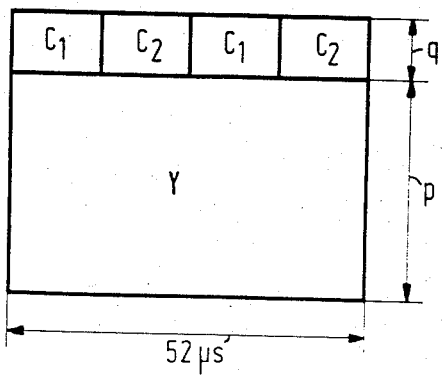
FIG. 3 shows, by way of illustration, a non-compatible color television system.

FIG. 3 shows a different structure of the picture which would be obtained with the signal of circuit 5 if no further measures were taken. FIG. 3 shows the signal of one field period, the width of the picture corresponding to the active duration of a line period, i.e. approximately 52 $\mu$s. At the top of the picture, there is a horizontal strip of q line periods divided into four equal parts. The component $C_1$ of the first line of the field period is compressed to one quarter of the active duration, i.e. approximately 13 $\mu$s of the first line of the picture. The subsequent 13 $\mu$s of the line shown comprise the component $C_2$ of the second line of the field period, while the component $C_1$ of the third line is compressed to the 13 $\mu$s subsequent thereto, and the component $C_2$ of the fourth line is compressed to the last 13 µs. Similarly, the second line of the horizontal strip comprises, one after the other, the component $C_1$ of the fifth line of the field period, the component $C_2$ of the sixth line, the component $C_1$ of the seventh line and the component $C_2$ of the eighth line. As p is four times larger than q, the strip comprises the chrominance information components of the p line periods whose luminance information Y is shown in the remaining portion of the picture in FIG. 3. Compared with the description given with reference to FIG. 2, the clock pulse frequency fc for reading the chrominance information components $C_1$ and $C_2$ is not applied to memories 18 and 19 continuously but with the aid of a switching signal of twice the line frequency and with the inverted polarity. During the first half of the period of the switching signal of twice the line frequency, i.e. during the first 13 µs of the first line period, memory 18 is read, and during the second half of said period, memory 19 is read. Both switching signals, that is to say the signals S4 and S5 of FIG. 2, occur during the first q line periods of the active duration of the field period. During the p line periods subsequent thereto, the non-compressed luminance information Y is displayed. However, from FIG. 1 and the associated description, it will be obvious that in the signal present at output 3, this information is replaced by a color television signal P in accordance with the PAL-standard, in which signal the same chrominance information components are present as in the topmost horizontal strip, although in a different form.

Figure 4:
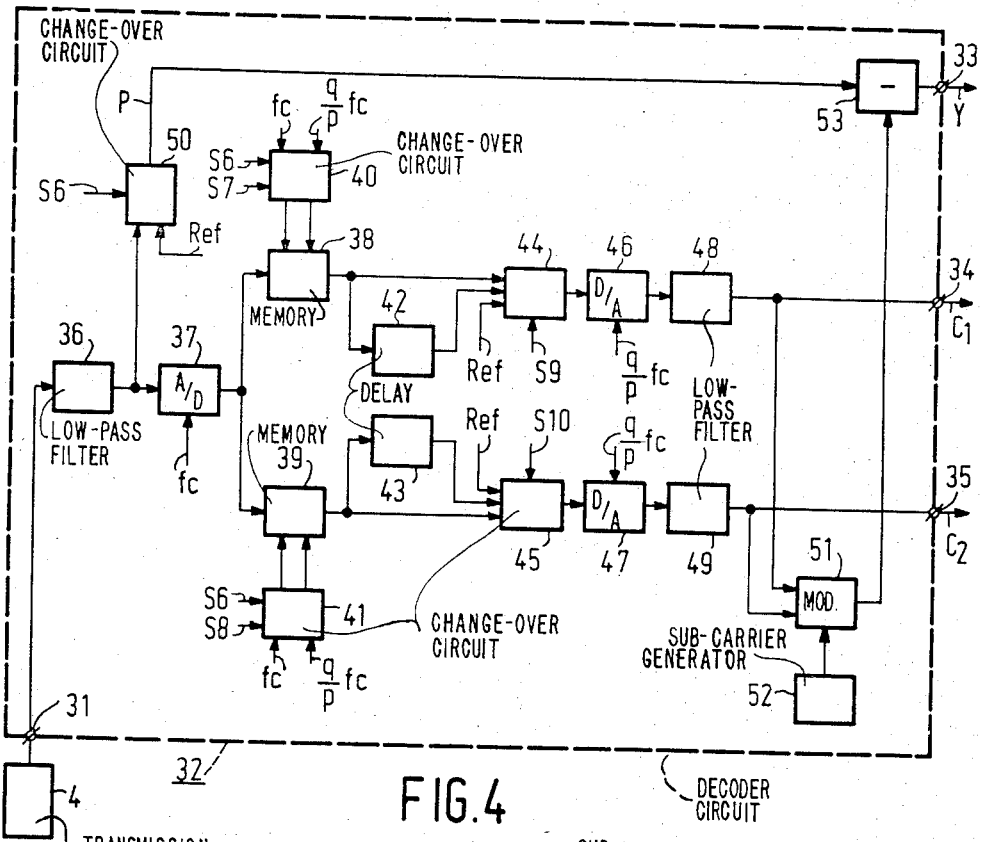
FIG. 4 is a block diagram of an embodiment of a data receiver suitable for use in a color television system according to the invention.

FIG. 4 shows an embodiment of a data receiver which receives the signal from channel 4 at an input 31 of a decoder circuit 32. The operation of this decoding circuit is fundamentally complementary to the operation of the encoding circuit 2 of FIG. 1, that is to say, that at outputs 33, 34 and 35, respectively, of decoding circuit 32 a luminance information component Y and chrominance information components $C_1$ and $C_2$ occur which correspond, to the best possible extent, to the portions of the information components Y, $C_1$ and $C_2$ processed in encoding circuit 2.

In decoding circuit 32, the input 31 is connected to the input of a low-pass filter 36. The output of filter 36 is connected to inputs of two memories 38 and 39 of a type having different write and read rates, via an analog-to-digital converter 37, to which a clock pulse signal is applied at the frequency fc. A change-over circuit 40, via which a clock pulse signal supply is effected at the respective clock pulse frequencies q/p fc and fc for reading and writing, respectively, under the control of respective switching signals S6 and S7, is associated with memory 38. Likewise, a change-over circuit 41, to which respective switching signals S6 and S8 for reading and writing are applied, is connected to memory 39. Time multiplex decoding and time decompression is effected with the aid of change-over circuits 40 and 41.

The outputs of the respective memories 38 and 39 are connected directly, and via delay devices 42 and 43, respectively, which delay devices produce time delays equal to a line period, to respective change-over circuits 44 and 45, respectively, which are controlled by the respective switching signals S9 and S10. The outputs of circuits 44 and 45, respectively, contain either the signal from the respective memories 38 and 39, or the signal delayed by the respective devices 42 and 43, or a reference information component Ref and are connected to an input of a low-pass filter 48 and 49, respectively, via respective digital-to-analog converters 46 and 47, to which clock pulse signals having frequency q/p fc are applied. The output of filter 36 is also connected to a change-over circuit 50, which also receives reference information Ref. Information Ref corresponds to a black level-reference information in television.

During operation, the information component $C_1$ received is written into memory 38 at the clock pulse frequency fc under the control of signal S7. The signal S7 has twice the line frequency and a duration of q line periods. Likewise, memory 39 is filled with the received information component $C_2$ under the control of signal S8, which has the same frequency and the same duration as signal S7, but is of the opposite polarity. Color television television information P becomes available at the output of filter 36. In the period of time of p line periods, circuit 50 conveys information P, while in response to signals S9 and S10, circuits 44 and 45 change over at half the line frequency for alternately conveying the relevant chrominance information components and the delayed information, the information being read from the respective memories 38 and 39 at the frequency q/p fc. The signals S9 and S10 are in antiphase.

During the p line periods in which the non-compressed luminance information is transmitted, the signals at the outputs of filters 48 and 49 are substantially the signals $C_1$ and $C_2$ which are generated by the signal source 1 of FIG. 1. These outputs are connected to the respective outputs 34 and 35 of decoding circuit 32. The signal at the output of change-over circuit 50 is substantially the color television signal P, which is present at output 3 and contains the luminance information Y generated by the signal source 1. The output of circuit 50 can be connected directly to the output 33 of decoding circuit 32. A matrix circuit, not shown, is connected to outputs 33, 34 and 35 for generating in known manner the color signals R, G and B for a color television tube. As the signal at output 33 also contains the chrominance information component encoded in accordance with the PAL-standard, it will be obvious that the color signals thus obtained will be faulty, since the chrominance information components contained therein will be processed as luminance information components. This error is known as cross-luminance and is not very annoying. Thanks to the time-multiplex encoding operation the cross-color error which is much more annoying is absent.

The cross-luminance error produced can be eliminated substantially wholly by providing decoding circuit 32 with a modulator 51, a sub-carrier generator 52 and a subtracting stage 53. Generator 52 generates a sub-carrier signal at the frequency prescribed by the PAL-standard and which can be synchronized with the signal from the sub-carrier generator 8 in the data generator in a way customary in PAL-receivers, that is to say, with the aid of the color burst signal during the line blanking period and a phase control loop. The signal from generator 52 and the signals $C_1$ and $C_2$ at the outputs of filters 48 and 49 are applied to modulator 51, which generates a modulated chrominance signal in accordance with the PAL standard, which is applied to an input of subtracting stage 53. A further input of stage 53 is connected to the output of stage 50. The modulated chrominance signal is subtracted from the PAL signal P by means of stage 53. In a suitable design, the luminance information Y generated by signal source 1 is then present substantilly alone at the output of stage 53. This output is connected to output 33.

Outside the p line periods, the reference information Ref is present at the respective outputs 33, 34 and 35, in response to the switching signals S9, S10 and S6 which are applied to the respective circuits 44, 45 and 50. This information corresponds to a black level. Compared with the display, laid down in the standard of 0.92 m line periods in each field period at an aspect ratio of 4:3, it follows that in the event of an unchanged display, a narrow black strip is present above the picture. Introducing the black level with the reference Ref prevents, on the one hand, cross-talk of the information of the picture to be displayed in the upper strip and, on the other hand, this strip is now available free from interference for display of other information components.

The described data generator of FIG. 4 is suitable for displaying a signal produced by the data generator shown in FIG. 1. A prior art receiver suitable for displaying signals in accordance with the PAL-color television standard can also display the signal produced by the data generator as shown in FIG. 1. The described transmission or data storage system is consequently compatible, as a signal in accordance with the PAL standard is transmitted during the above-mentioned p line periods. If no further measures are taken, a portion of the color information will indeed be visible in the displayed picture, which annoying phenomenon is prevented by adding, outside the p line periods, by means of an adder stage, which is not shown for the sake of simplicity, a reference information component to the time-division multiplex encoded signal, that is to say, to the output of time-division multiplex circuit 5. This reference information occurs during the line blanking interval before the chrominance information is supplied, that is to say, during the interval in which the black level is determined in the PAL-receiver, for example, by means of a clamping circuit. If, in the data generator, said reference information corresponds to the greatest possible amplitude of the chrominance information, then the chrominance information will be displayed in the PAL-receiver in black during the remainder of the line. During the line blanking interval, the color burst signal must indeed be present to prevent the sub-carrier oscillator in the PAL-receiver from being moved out of synchronization. In the data receiver shown in FIG. 4, reference information is added to the output of filter 36 by means of an adder stage, not shown for the sake of simplicity, which is complementary to said reference information in the data generator and which cancels the effect of the latter. Suppressing in the PAL-receiver the chrominance information during the q lines, can alternatively be realized by having relevant information transmitted by the data generator, which is then a transmitter, by means of a teletext page.

The choice of numbers of p and q line periods can be based on different requirements. One of the considerations relates to the picture quality on display and hence the bandwidth of the chrominance and luminance information components. It has been found that a time compression factor $q/p=\frac{1}{4}$ is an optimum factor. A further requirement is the compatibility with the standardized television system in which 0.92 m line periods of the m line periods of each field period are used for the display of information, so that for $m=312.5$, it holds that 287.5 line periods are available for display. For a picture having 288 lines, it follows that when $p=248$ and $q=62$ a black strip of not more than 40 lines may be present on display. In practice, the displayed picture is formed from less than the number of lines standardized therefor, so that the strip will be narrower. In the standard, the value 4:3 is laid down for the aspect ratio. Starting from a likewise prescribed field blanking-field period ratio equal to 0.08, it follows that to obtain an aspect ratio equal to substantially 5:3, the number of p line periods must be of the order of 0.8 times 0.92 m i.e. equal to 0.736 m. The aspect ratio equal to 5:3 is suitable for wide screen cine films and has also been proposed for high-definition television. When $m=312.5$ line periods of each field period, it follows that $p=230$. When a time compression factor $q/p$ equal to $\frac{1}{3}$ is opted for, p may be chosen to be equal to 228 and q to 76 with an aspect ratio equal to 5.05:3.

Figure 5:
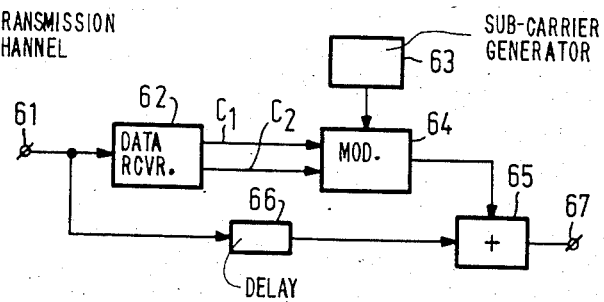
FIG. 5 shows a block diagram of a circuit suitable for receiving a signal in accordance with FIG. 3 and for conveying a signal in accordance with the invention.

FIG. 5 shows a circuit suitable for the collective reception, for example, by means of a cable television system, of information transmitted as shown in FIG. 3, that is to say, without being compatible. In that case, the data generator does not comprise the components 6, 7, 8 and 9, so that no modulated chrominance information component is added in the output signal to the information Y. Reference numeral 61 in FIG. 5 denotes an input of the circuit. Input 61 is connected to, for example, a receiving cable. The signal present at input 61 is applied to a data receiver 62, which is suitable for recovering the information components $C_1$ and $C_2$ encoded at the transmitting end in accordance with FIG. 3. Compared with the receiver shown in FIG. 4, receiver 62 may be of a simple construction, that is to say, without the components 50 to 53. In addition, the circuit shown in FIG. 5 comprises a sub-carrier generator 63 and a modulator 64, to which the sub-carrier generated by generator 63 and also the components $C_1$ and $C_2$ obtained are applied to obtain a modulated chrominance signal in accordance with the PAL standard, and which is applied to an input of an adder stage 65. The signal present at input 61 is applied to a further input of the stage 65 via a delay element 66 which produces a delay of approximately 1 μs to compensate for the time delay caused by the components 62 and 64. The signal available at an output 67 of stage 65 is a signal which corresponds to the signal generated by the data generator shown in FIG. 1, so it is a signal which can be received and processed by both a data receiver as shown in FIG. 1 and a PAL-receiver for displaying the information components Y, $C_1$ and $C_2$. The non-compatible signal present at input 61 has been replaced by a compatible signal in this simple way.

In the foregoing, a transmission (or data storage) system is described which is compatible with the PAL color television standard. It will be obvious that the system can also be compatible with the SECAM standard in a similar way as described in the foregoing. To that end the components 6 and 8 of FIG. 1, 51 and 52 of FIG. 4 and 63 and 64 of FIG. 5 must be constructed in accordance with this standard. Similarly, the system can be compatible with the NTSC-color television standard, in which case the numbers p and q must be adapted to the number $m=262.5$ line periods per field period in accordance with this standard. When $q/p=\frac{1}{4}$, a suitable choice is, for example, $p=208$ and $q=52$. Compared with a standardized picture having 0.92 $m=242.5$ line periods, it follows, relative to the value 244, that there may be a black strip having a maximum of 36 lines. With a time compression factor $q/p$ equal to $\frac{1}{3}$ and $p=192$ and $q=64$, an aspect ratio equal to 5.03:3 is found. Since, in the NTSC standard, the I and Q-chrominance information components, contrary to the corresponding components U and V in the PAL-standard, have unequal bandwidths, different write rates can be used in memories 18 and 19 for processing the chrominance information, each component having its own, adapted, time compression factor.

The data generator for the data transmission (or storage) system according to the invention also comprises a sound section for supplying sound information. Because of the requirement as regards compatibility, this information is transmitted in the manner described in the relevant television standard. In accordance with the European standard, for example, the frequency of the sound carrier is 5.5 MHz, which implies that the bandwidth of the picture signal supplied is limited to approximately 5 MHz before it is combined with the sound signal. If, after the processing operation described in the foregoing, the picture signal has a bandwidth wider than 5 MHz, a filter can be used to suppress in this signal the frequencies around 5.5 MHz. In a different way, the luminance information can be applied in the data generator of FIG. 1 to two channels, more specifically, a first channel for the lower frequency components i.e. between 0 and 5 MHz and a second channel for the higher frequency components, for example between 5 and 8 MHz. By means of time compression, with the aid of a memory from which information can be read at a higher rate than information is written into it, the frequency band of the second channel is moved to a higher frequency band of, for example, 6 to 8 MHz The signal obtained, and also the signal from the first channel, are applied during the p line periods to the adder stage 23 of FIG. 2, in which these signals are added to the time-compressed chrominance signals. Account must then be taken of the delays produced. The picture signal obtained has no frequency components between 5 and 6 MHz, it can be combined in a customary way with the sound signal. The signal from the first channel can be received and processed in a customary way by a standard PAL-receiver. In the data receiver shown in FIG. 4, the frequency of the received signal is split and processed further in a similar way as in the data generator.

What is claimed is:

1. A color television transmission system having time-division multiplex encoding, the system comprising a data generator, at least one data receiver, and a transmission channel arranged between the generator and the receiver, the data generator comprising a signal source for producing signals containing luminance, chrominance, synchronizing and identification information, and an encoding circuit for supplying, from an output, a time-division multiplex encoded signal for transmission via the transmission channel, this time-division multiplex encoded signal comprising, during a number of p line periods of a field period, non-compressed luminance information and, during a number of q line periods of a field period, different from said p line periods, time-compressed chrominance information associated with said luminance information, the number p+q being less than the number of m line periods forming a field period, the data receiver comprising a decoding circuit coupled to said transmission channel and suitable for supplying signals containing at least luminance and chrominance information which largely corresponds to the data produced by the signal source in the data generator, characterized in that the encoding circuit is such that it supplies a signal in which the chrominance information, supplied during said q line periods, is also added to the luminance information during said p line periods in accordance with the PAL-, NTSC or SECAM color television standards.

2. A data generator suitable for use in a color television system as claimed in claim 1, the encoding circuit comprising a time-division multiplex circuit for receiving the luminance and chrominance information components and for generating the time-division multiplex encoded signals therefrom, the time-division multiplex circuit comprising a memory which, during the number of p consecutive line periods, is operative with the same write and read rates for the luminance information, and a memory which, during the number of q consecutive line periods, is operative with different write and read rates for processing the chrominance information, characterized in that the encoding circuit also comprises a sub-carrier generator for generating a sub-carrier signal in accordance with one of said PAL, NTSC or SECAM color television standards, a modulator for modulating the chrominance information produced by the signal source on the sub-carrier signal in the manner prescribed by the respective color television standard, a delay device for delaying the modulated chrominance signal obtained for the duration of one field period, and an adder stage for adding the delayed signal to the time-division multiplex encoded signal.

3. A data generator as claimed in claim 2, characterized in that the modulator is inoperative during said q line periods.

4. A data generator as claimed in claim 2, characterized in that the data generator comprises means for suppressing the time-compressed chrominance information on display by a data receiver suitable for receiving and displaying a color television signal in accordance with the respective color television standard.

5. A data generator as claimed in claim 4, characterized in that the encoding circuit comprises an adder stage for adding, outside of said p line periods during the line blanking interval, reference information to the time-division multiplex encoded signal, the reference information corresponding to the largest possible amplitude of the chrominance information.

6. A data generator as claimed in claim 2, characterized in that the time-division multiplex circuit and a decoding circuit are arranged, one after the other, between the signal source and the modulator, the decoding circuit being suitable for supplying signals having chrominance information which largely corresponds to the information supplied by the signal source, the modulator being connected, without delay, to the adder stage.

7. A data generator as claimed in claim 2, characterized in that the data generator comprises a first channel for conveying lower frequency components of the luminance information, a second channel for conveying higher frequency components of the luminance information, the second channel comprising the frequency band which corresponds to the frequency spectrum of the sound signal in the relevant color television standard, a time compression circuit for converting the frequency band of the second channel to a frequency band which is located at a higher frequency, and an adder stage for adding the signal obtained to the signal from the first channel.

8. A data receiver suitable for use in a color television system as claimed in claim 5, the decoding circuit for the time decompression of the chrominance information comprising memories having different write and read rates, the memories for the time-division multiplexed decoding being writable in different time periods, characterized in that the decoding circuit also comprises an adder stage for adding a reference information to the outputs of said memories outside said p line periods, this reference information being fundamentally complementary to the reference information added in the data generator.

9. A data receiver suitable for use in a color television system as claimed in claim 2, the decoding circuit for the time decompression of the chrominance information comprising memories having different write and read rates, the memories for time-division multiplexed decoding being writable in different time periods, characterized in that the decoding circuit also comprises a sub-carrier generator for generating a sub-carrier signal in accordance with said respective color television standard which is substantially in synchronism with the sub-carrier signal in the data generator, a modulator for modulating the chrominance information supplied by the decoding circuit onto the sub-carrier signal in the way prescribed by the respective color television standard, and a subtracting stage for subtracting, during said p line periods, the modulated chrominance signal obtained from the signal received.

* * * * *